(12) United States Patent
Kim et al.

(10) Patent No.: US 8,761,600 B2
(45) Date of Patent: Jun. 24, 2014

(54) IN-BAND SUPERVISORY DATA MODULATION

(75) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 13/620,172

(22) Filed: Sep. 14, 2012

(65) Prior Publication Data

US 2014/0079391 A1   Mar. 20, 2014

(51) Int. Cl.
*H04B 10/07* (2013.01)
*H04B 10/50* (2013.01)

(52) U.S. Cl.
USPC ............................................................ 398/30

(58) Field of Classification Search
CPC . H04B 10/077; H04B 10/5161; H04B 10/532
USPC .................................................... 398/30–33
See application file for complete search history.

(56) References Cited

U.S. PATENT DOCUMENTS

| | | | |
|---|---|---|---|
| 5,956,165 A | 9/1999 | Fee et al. | |
| 6,108,113 A | 8/2000 | Fee | |
| 2009/0196603 A1* | 8/2009 | Zhou et al. | 398/32 |

OTHER PUBLICATIONS

Feuer et al., "Digital Lightpath Label Transcoding for Dual-Polarization QPSK Systems", Optical Fiber Communication Conference, OSA Technical Digest (Optical Society of America), Mar. 2011, paper JWA028.

Tanimura et al., "Superimposition and Detection of Frequency Modulated Tone for Light Path Tracing Employing Digital Signal Processing and Optical Filter", Optical Fiber Communication Conference and Exposition (OFC/NFOEC), 2012 and the National Fiber Optic Engineers Conference, Mar. 2012, pp. 1-3.

Faruk et al., "Multi-impairment monitoring from adaptive finite-impulse-response filters in a digital coherent receiver", Optics Express, Dec. 2010, vol. 18, Issue 26, pp. 26929-26936.

Tanimura et al., "In-band FSK Supervisory Signaling between Adaptive Optical Transceivers Employing Digital Signal Processing", in 37th European Conference and Exposition on Optical Communications, OSA Technical Digest (Optical Society of America), Jul. 2011, paper We.7.A.6.

* cited by examiner

*Primary Examiner* — Leslie Pascal
(74) *Attorney, Agent, or Firm* — Maschoff Brennan

(57) ABSTRACT

According to an aspect of an embodiment, a method of modulating supervisory data onto an optical signal includes receiving supervisory data and adjusting a characteristic of a carrier of the optical signal for at least one of a first polarization component of the optical signal and a second polarization component of the optical signal based on the received supervisory data. The characteristic may be adjusted such that there is a relative difference between the characteristic for the first polarization component and the second polarization component. The relative difference of the characteristic between the first polarization component and the second polarization component may indicate the supervisory data. Alternately, the characteristic may be adjusted such that there is a change in a polarization orientation of the carrier on a Poincaré sphere that indicates the supervisory data.

20 Claims, 11 Drawing Sheets

IN-BAND SUPERVISORY DATA MODULATION

FIELD

The embodiments discussed herein are related to in-band modulation of supervisory data in optical communication networks.

BACKGROUND

Telecommunications systems, cable television systems and data communication networks use optical networks to rapidly convey large amounts of information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. The optical network may communicate supervisory data indicating any number of characteristics associated with the optical network, including source information, destination information and routing information, and other management information of the optical network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of modulating supervisory data onto an optical signal includes receiving supervisory data and adjusting a characteristic of a carrier of the optical signal for at least one of a first polarization component of the optical signal and a second polarization component of the optical signal based on the received supervisory data. The characteristic may be adjusted such that there is a relative difference between the characteristic for the first polarization component and the second polarization component. The relative difference of the characteristic between the first polarization component and the second polarization component may indicate the supervisory data. Alternately, the characteristic may be adjusted such that there is a change in a polarization orientation of the carrier on a Poincaré sphere that indicates the supervisory data.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present disclosure will be explained with reference to the accompanying drawings.

Figure 1A:
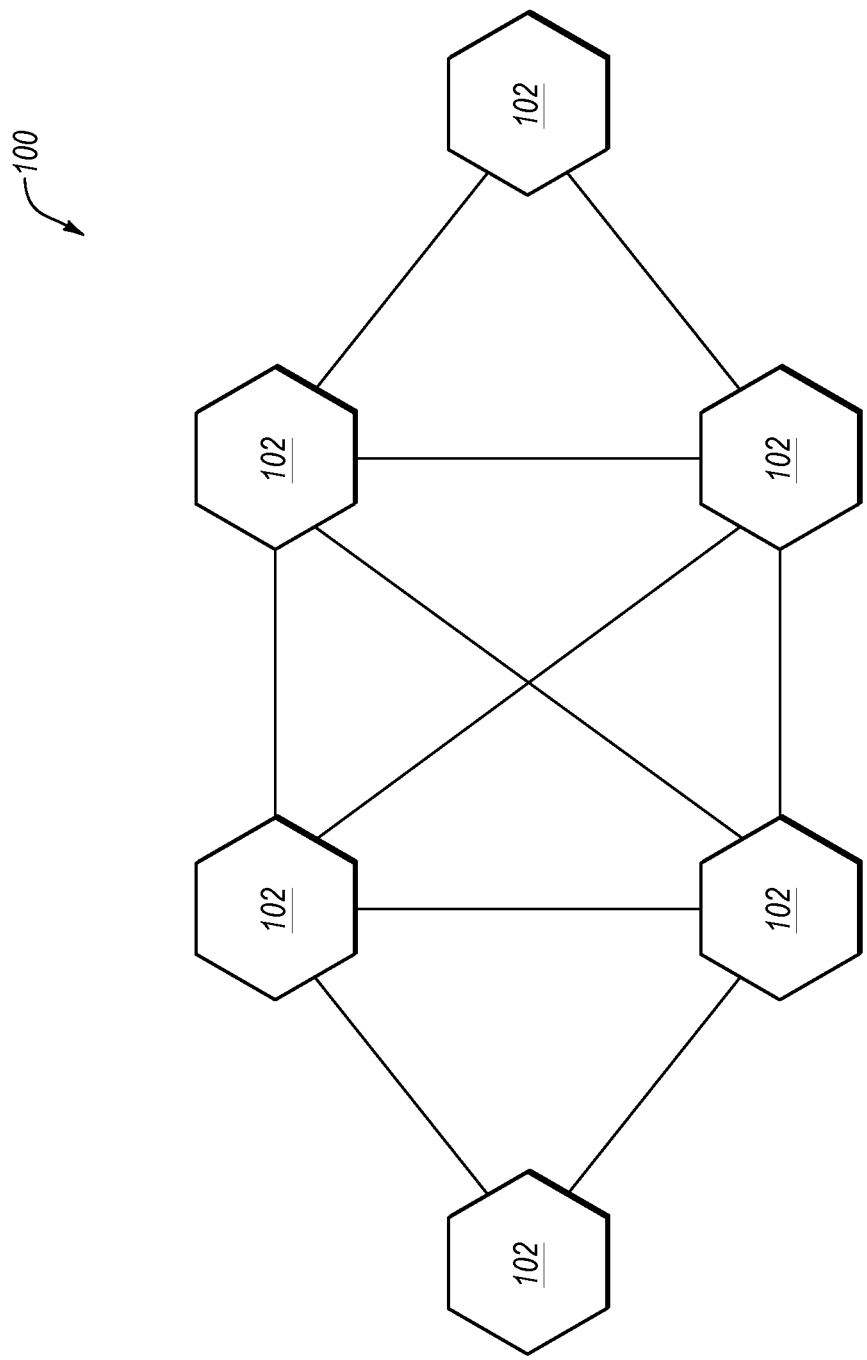
FIG. 1A illustrates an example embodiment of an optical network.

FIG. 1A illustrates an example embodiment of an optical network 100, arranged in accordance with at least some embodiments of the present disclosure. In general, the optical network 100 may be configured to communicate supervisory data within the same wavelength band or channel used to carry main data of the optical network, which may be referred to as "in-band supervisory signaling". The supervisory data may include information associated with management of the optical network 100 including, but not limited to, source information, destination information and routing information, and other management information of the optical network. In some embodiments the supervisory data may be used to detect routing errors of optical signals within the optical network 100.

As described in further detail below, the optical network 100 may perform in-band supervisory data modulation through control channel modulation of supervisory data onto an optical signal also carrying main data at a relatively high-speed symbol rate (e.g., a rate greater than several Gigabaud (Gbaud) in some embodiments) as compared to a symbol rate of the supervisory data (e.g., a rate less than tens of mega baud (Mbaud) in some embodiments). One or more nodes 102 of the optical network 100 may be configured to modulate the supervisory data without using overhead space associated with the main data. Additionally, the in-band supervisory data modulation may be performed with little to no variation of the power of the optical signal, and with little to no effect on the supervisory data due to drift of phase and/or frequency of a laser of an optical transmitter of a node 102 that generates the optical signal.

The in-band supervisory data modulation may be implemented in the optical domain or the electrical domain. When implemented in the optical domain, one or more "additional" optical components may be provided to accomplish the in-band supervisory data modulation at the optical transmitters of the nodes 102, which optical components are not provided in embodiments in which the in-band supervisory data modulation is implemented in the electrical domain. Analogously, one or more receivers of the nodes 102 of the optical network 100 may be configured to demodulate the supervisory data in the optical domain or in the electrical domain. In the same or other embodiments, as described in further detail below, a supervisory data detector ("SV detector") of one or more of the nodes 102 may be configured to demodulate the supervisory data. When implemented in the electrical domain, one or more "additional" optical components used to demodulate the supervisory data in the optical domain may be omitted.

In the illustrated embodiment, the optical network 100 is depicted as a mesh optical network. However, the optical network 100 may be any suitable optical network including a point-to-point optical network with terminal nodes, a ring optical network, a mesh optical network, or any other suitable optical network or combination of optical networks.

The nodes 102 may be configured to communicate information to each other via optical signals carried by optical fibers. The optical signals may be generated by modulating one or more beams of light with the information such that the beams of light act as carrier waves (also referred to as "carriers") of the information. Any suitable modulation scheme may be used to encode the information including, but not limited to, any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.).

The information modulated onto each beam of light may include main data and supervisory data. Main data may include customer data or other data transmitted through the optical network 100 for use by users of the optical network 100, for example. As previously mentioned, the supervisory data may include information associated with management of the optical network 100, examples of which are provided above. As described in detail below with respect to FIGS. 2-5, one or more optical transmitters of the nodes 102 may be configured to modulate supervisory data onto an optical signal such that the symbol rate of the supervisory data is relatively slow compared to the symbol rate of the main data. The relatively low-speed supervisory data symbol rate may allow for in-band transmission of the supervisory data on the optical signal with little to no interference with the main data also transmitted on the optical signal.

Figure 1B:
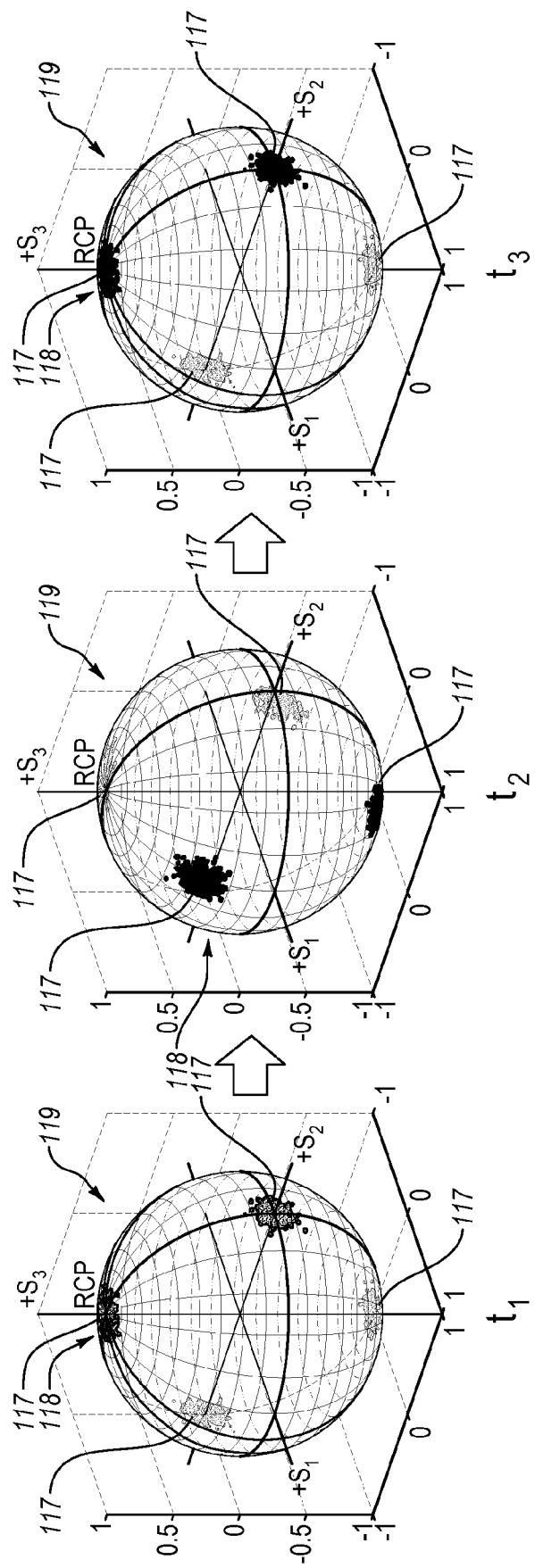
FIG. 1B illustrates an example of carrier polarization modulation.
Figure 1C:
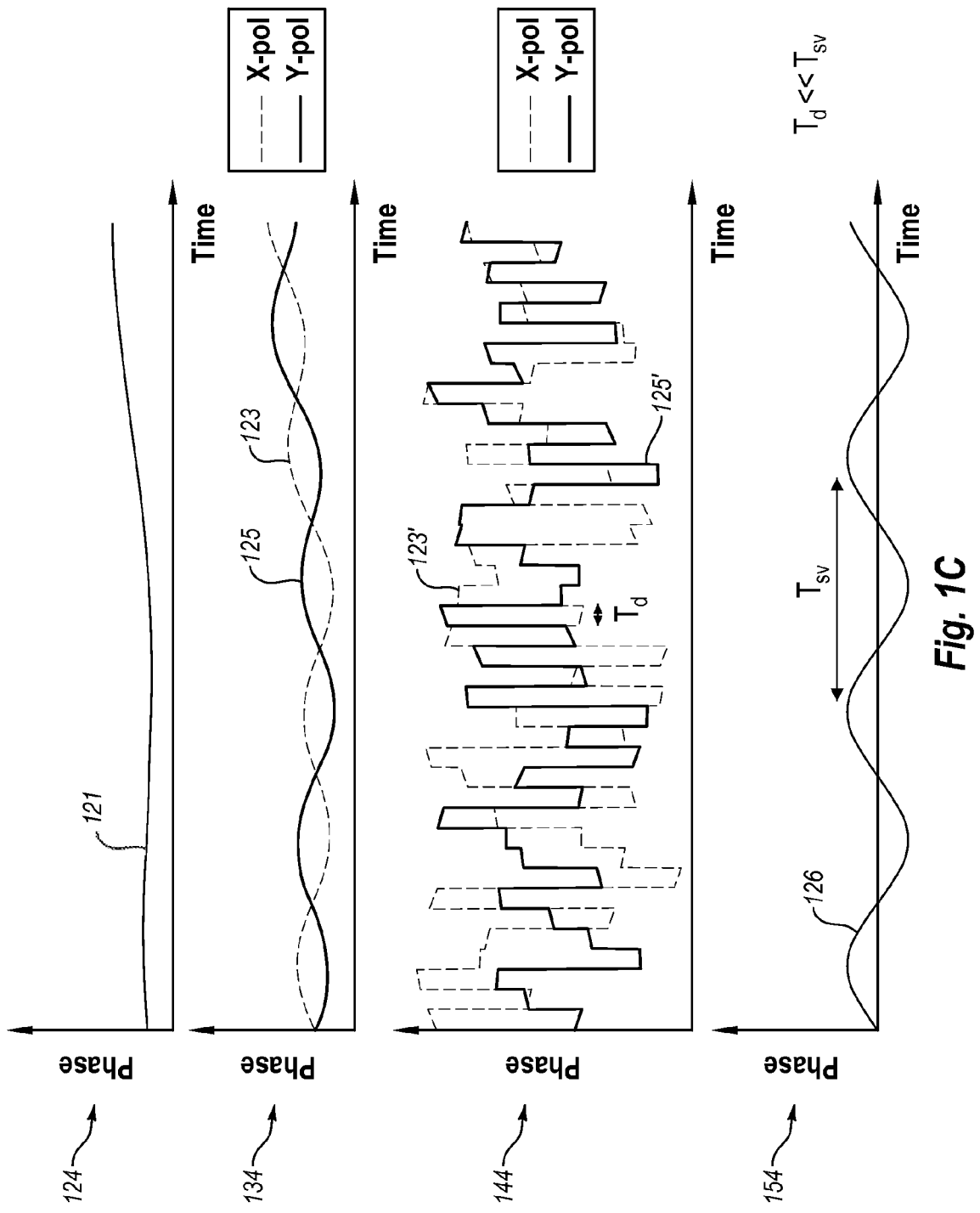
FIG. 1C includes example graphs depicting relative carrier phase modulation.
Figure 1D:
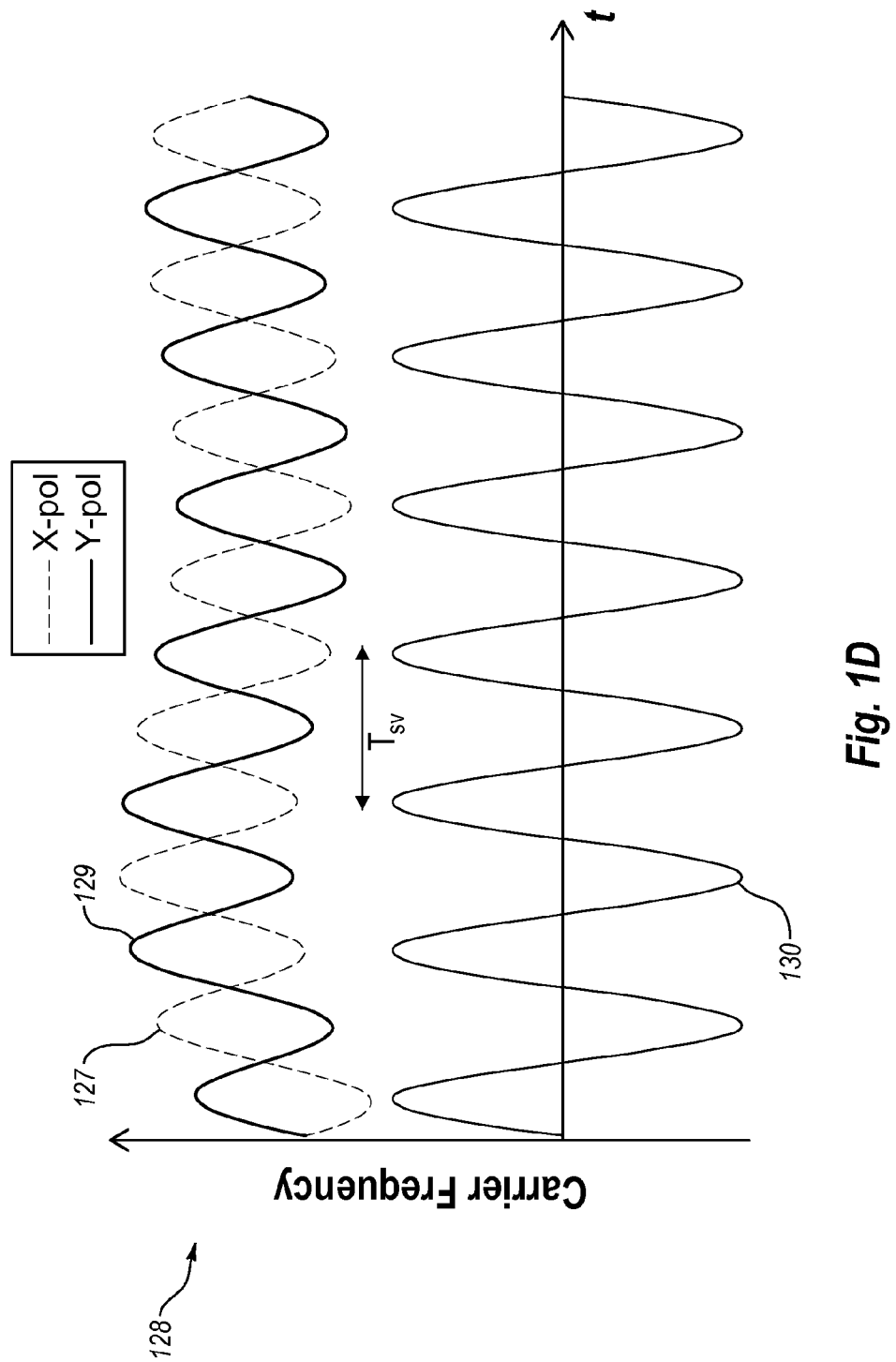
FIG. 1D is an example graph depicting relative carrier frequency modulation.

The low-speed, in-band modulation may be done using one or more modulation schemes including modulation of the polarization of a carrier of an optical signal (also referred to as "carrier polarization modulation" and described with respect to FIG. 1B), relative carrier phase modulation between orthogonal polarization components (also referred to as "relative carrier phase modulation" and described with respect to FIG. 1C), and relative carrier frequency modulation between orthogonal polarization components (also referred to as "relative carrier frequency modulation" and described with respect to FIG. 1D). As discussed in detail below with respect to FIGS. 2-5, one or more optical transmitters may be configured to modulate the supervisory data in the electrical domain in some embodiments and, in alternative embodiments, may be configured to modulate the supervisory data in the optical domain.

FIG. 1B illustrates an example of carrier polarization modulation, arranged in accordance with at least some embodiments of the present disclosure. For carrier polarization modulation, supervisory data may be modulated at a relatively slow symbol rate (as compared to the symbol rate of the main data) by rotating the orientation of the polarization of the carrier associated with the optical signal.

For example, FIG. 1B illustrates a Poincaré sphere 119 at times $t_1$, $t_2$ and $t_3$ with a constellation 118 of main data 117 of a DP-QPSK optical signal. The orientation of the constellation 118 on the Poincaré sphere 119 depends on the polarization orientation of a carrier of an optical signal at times $t_1$, $t_2$ and $t_3$. At time $t_1$ the orientation of the constellation 118 may be substantially aligned with the axes of the Poincaré sphere 119. At time $t_2$, the orientation of the constellation 118 has been changed because the orientation of the polarization of the carrier may be rotated (as shown by the change in location of the constellation 118 on the Poincaré sphere 119) based on a change in the supervisory data. At time $t_3$, the orientation of the polarization of the carrier may be rotated back to its previous position (as shown by the constellation 118 being in the same position as at time $t_1$) based on a change in the supervisory data. Accordingly, supervisory data may be modulated onto the optical signal by adjusting the orientation of the polarization of the carrier associated with the optical signal.

The in-band supervisory data modulation rate in the example carrier polarization modulation may have an associated supervisory data symbol period $T_{sv}$ that is substantially longer than the main data symbol period $T_d$ due to the relatively slow in-band supervisory data modulation rate as compared to the main data symbol rate. Additionally, in some instances, the supervisory data symbol rate may be chosen by taking into account uncontrolled rotation of the polarization orientation of the carrier as the optical signal propagates through an optical network. This uncontrolled rotation generally occurs at a relatively slow rate (e.g., the tens of kilohertz range). Therefore, in such instances, the carrier polarization modulation rate of the supervisory data may be faster than a potential uncontrolled polarization rotation rate caused by the optical network, but slower than the symbol rate of the main data. As such, the supervisory data may be distinguished from both the main data and the uncontrolled rotation of the carrier for demodulation.

Modifications, additions, or omissions may be made to the embodiment of carrier polarization modulation described with respect to FIG. 1B without departing from the scope of the present disclosure. For example, the locations of the constellation 118 on the Poincaré sphere 119 at different times and the degree of change are merely conceptual depictions of carrier polarization modulation. The actual degree of change of the polarization orientation of the carrier and the locations of the constellation 118 may vary according to particular design constraints and considerations.

FIG. 1C illustrates example graphs depicting relative carrier phase modulation, arranged in accordance with at least some embodiments of the present disclosure. For relative carrier phase modulation of supervisory data, the supervisory data may be modulated at a relatively slow symbol rate (as compared to the symbol rate of the main data) by changing the relative carrier phase between orthogonally polarized components of the optical signal. Additionally, relative carrier phase modulation may be a specific form of carrier polarization modulation because the polarization orientation of the carrier may rotate as the relative carrier phase difference between orthogonally polarized components changes.

A graph 124 of FIG. 1C illustrates a carrier phase drift 121 of X and Y polarization components of an optical signal before relative carrier phase modulation. As illustrated in the graph 124, the carrier phase drift 121 of the X and Y polarization components may be substantially the same because the carrier may originate from a single laser and the phase of both the X and Y polarization components may slowly drift together due to carrier phase noise which is associated with the finite line width of the laser. In contrast, a graph 134 of FIG. 1C, illustrates the carrier phase of an X-polarization component 123 and a Y-polarization component 125 after relative carrier phase modulation. A graph 144 of FIG. 1C similarly illustrates the carrier phase of the X-polarization component 123 and the Y-polarization component 125 with the main data also modulated on the optical signal (depicted as X-polarization component 123' and Y-polarization component 125' in the graph 144). As depicted in the graphs 134 and 144, the relative carrier phase between the X-polarization component 123 and the Y-polarization component 125 may vary. The difference between the carrier phase of the X-polarization component 123 and the Y-polarization component 125 may be based on the supervisory data and may indicate a supervisory signal 126 depicted in a graph 154 of FIG. 1C. As described in further detail below, the supervisory signal 126 may be estimated from the signal depicted in the graph 144 and the carrier phase drift 121 depicted in the graph 124 may be reduced and/or eliminated.

Additionally, and as already described with respect to FIG. 1B above, the supervisory data may have a modulation rate associated with a supervisory data symbol period $T_{sv}$ that is substantially longer than the main data symbol period $T_d$. Therefore, as in carrier polarization modulation, the supervisory data symbol rate may be substantially slower than the symbol rate of the main data. Such an embodiment may allow for in-band transmission of the supervisory data on the optical signal with little to no interference with the main data also being transmitted on the optical signal. Additionally, the carrier phase drift 121 may have little to no effect on the relative carrier phase modulation because the drift may affect the carrier phase of both the X-polarization component 123 and the Y-polarization component 125 such that the relative phase difference between the carrier phase of the X and Y polarization components 123 and 125, respectively, may not be affected by the carrier phase drift 121.

Modifications, additions, or omissions may be made to the embodiment of relative carrier phase modulation described with respect to FIG. 1C without departing from the scope of the present disclosure. For example, the graphs 124, 134, 144, and 154 are merely a conceptual depiction of relative carrier phase modulation. The actual relative change in carrier phase of the different components of the optical signal may vary according to particular design constraints and considerations. Additionally, the frequencies of the X and Y polarization components 123 and 125, as well as of the supervisory signal 126 may vary. Additionally, the actual orientation of the X and Y polarization components may vary.

FIG. 1D is an example graph 128 depicting relative carrier frequency modulation, arranged in accordance with at least some embodiments of the present disclosure. For relative carrier frequency modulation of supervisory data, the supervisory data may be modulated at a relatively slow symbol rate (as compared to the symbol rate of the main data) by changing the relative carrier frequency between orthogonally polarized components of the optical signal, e.g., by changing the relative carrier frequency between an X polarization component 127 and a Y polarization component 129 of the optical signal.

For example, the top portion of the graph 128 depicts the X and Y polarization components 127 and 129, respectively, of the main data associated with an optical signal. The carrier frequency of at least one of the X-polarization component 127 and the Y-polarization component 129 may be adjusted to modulate the supervisory data onto the optical signal such that the relative carrier frequency difference between the X and Y polarization components 127 and 129, respectively, changes based on the supervisory data. Accordingly, supervisory data may be modulated onto the optical signal by adjusting the relative carrier frequency difference between the X and Y polarization components 127 and 129 of the optical signal. Supervisory signal 130 illustrated in the graph 128 is an example of a signal including supervisory data that may be imposed on the optical signal through relative carrier frequency modulation of the X-polarization component 127 and/or the Y-polarization component 129.

Additionally, and as already described with respect to FIGS. 1B and 1C, the supervisory data may have a modulation rate associated with a supervisory data symbol period $T_{sv}$ that is substantially longer than the main data symbol period $T_d$. Therefore, as in carrier polarization modulation, and relative carrier phase modulation, the supervisory data symbol rate may be substantially slower than the symbol rate of the main data. Such an embodiment may allow for in-band transmission of the supervisory data with little to no interference with the main data also being transmitted on the optical signal. Additionally, frequency drift by lasers of the optical transmitters may have little to no effect on the relative carrier frequency modulation because the drift may affect the carrier of both the X-polarization component 127 and the Y-polarization component 129 such that the relative carrier frequency difference between the X and Y polarization components 127 and 129 may not be affected by the frequency drift.

Modifications, additions, or omissions may be made to the embodiment of relative carrier frequency modulation described with respect to FIG. 1D without departing from the scope of the present disclosure. For example, the graph 128 is merely a conceptual depiction of relative carrier frequency modulation. The actual relative change in frequency of the X and Y polarization components 127 and 129, respectively, may vary according to particular design constraints and considerations. Additionally, the frequencies of the X and Y polarization components 127 and 129, respectively, as well as of the signal 126 are merely illustrative and may vary depending on particular design constraints and applications. Further, the actual orientation of the X and Y polarization components may vary.

Returning to FIG. 1A, as mentioned above, one or more of the nodes 102 may include one or more receivers and/or SV detectors configured to demodulate supervisory data modulated onto the optical signal using carrier polarization modulation, relative carrier phase modulation or relative carrier frequency modulation such as has been described above. Accordingly, one or more of the receivers may include a coherent optical receiver configured to demodulate and extract the supervisory data from an optical signal (described with respect to FIG. 6). In the same or alternative embodiments, one or more SV detectors may include a tunable frequency discriminator, a polarimeter and a signal processor configured to receive a tapped signal of the optical signal and separate orthogonal polarization components from the tapped signal such that the supervisory data may be detected and extracted from the tapped signal (described in detail with respect to FIG. 7). In some embodiments, the SV detector may be included with an optical receiver, and in other embodiments, the SV detector may be separate from an optical receiver.

Therefore, the optical network 100 may be configured to modulate supervisory data at a relatively slow symbol rate onto an optical signal also carrying main data at a relatively fast symbol rate as compared to the supervisory data symbol rate. Such a configuration may allow for low speed detection of the supervisory data, may not involve additional optical components (in some embodiments) for in-band supervisory data modulation, transmission and demodulation, may not use overhead associated with the main data, may have little to no interference between the supervisory data and the main data transmitted on the same optical signal, and/or may generate little to no variation in the average power of the optical signal.

Modifications, additions or omissions may be made to the optical network 100 without departing from the scope of the present disclosure. For example, the optical network 100 may include more or fewer nodes 102 than those depicted. Additionally each node 102 may have different functionality. Also, as mentioned above, although depicted as a mesh optical network, the optical network 100 may be any suitable optical network for transmitting optical signals such as a ring or point-to-point optical network.

Figure 2:
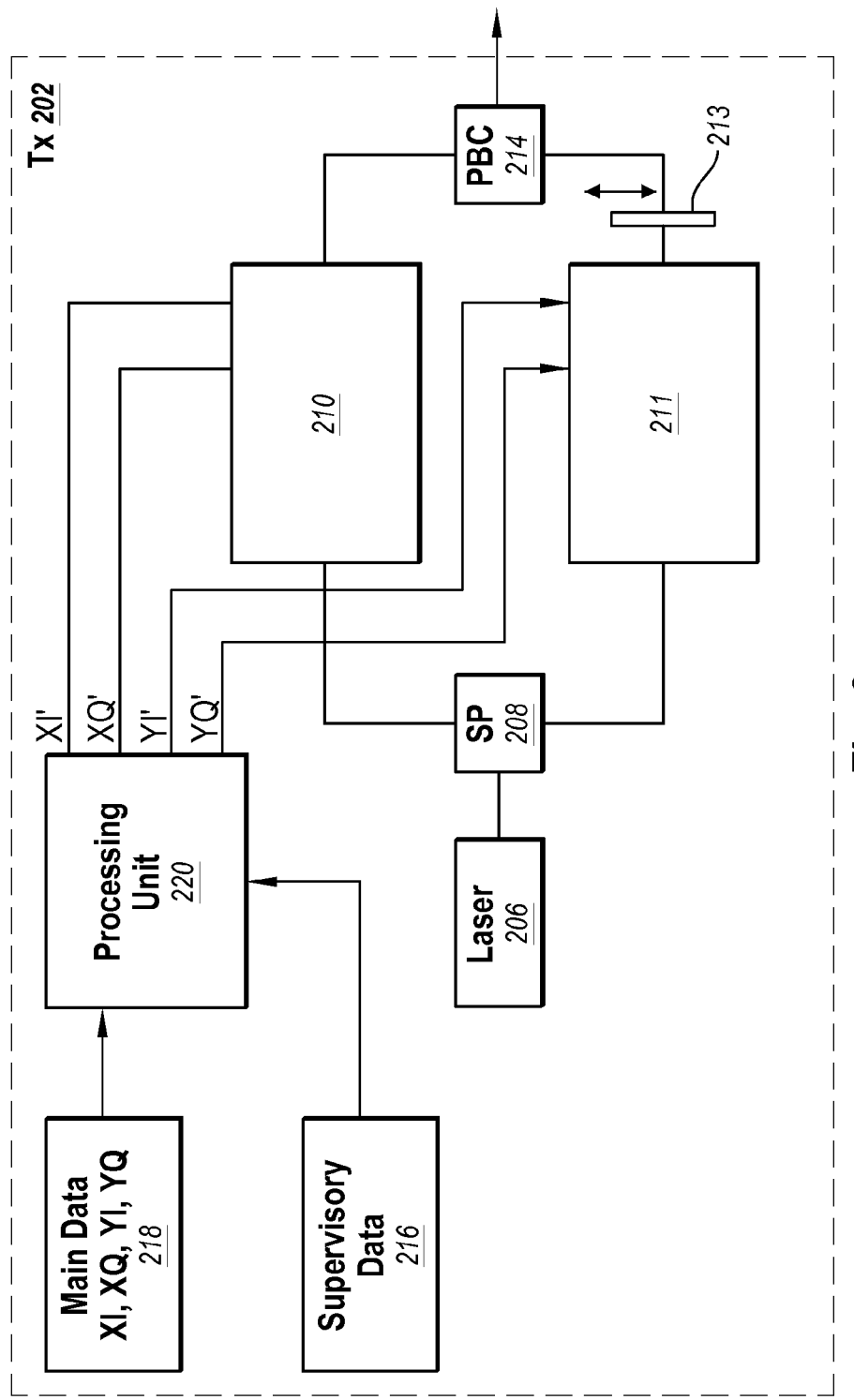
FIG. 2 illustrates an example embodiment of an optical transmitter configured to modulate supervisory data for an optical signal in the electrical domain.

As mentioned above, an optical transmitter may be configured to modulate supervisory data for an optical signal in the electrical domain prior to generating the optical signal. FIG. 2 illustrates an example embodiment of an optical transmitter 202 configured to modulate supervisory data for an optical signal in the electrical domain, arranged in accordance with at least some embodiments of the present disclosure. One or more of the nodes 102 of FIG. 1A may include one or more of the optical transmitter 202, for example. In the illustrated embodiment, the optical transmitter 202 may be configured to perform DP-QPSK modulation. However, the same principles for performing in-band supervisory data modulation described below may apply with respect to any optical transmitter configured to perform any applicable polarization multiplexed or dual-polarization modulation scheme.

The optical transmitter 202 may include a laser 206 or other optical signal source configured to generate a beam of light within a particular wavelength range associated with a channel of the optical signal. In some embodiments, the laser 206 may be tunable across one or more wavelength ranges which may or may not be associated with one or more wavelength ranges. The beam of light generated by the laser 206 may be directed toward a splitter (SP) 208 that may split the beam of light into two beams that may act as carriers. The splitter 208 may direct one of the beams toward an optical I (in-phase) Q (quadrature-phase) modulator (referred to hereinafter as "IQ modulator") 210. The splitter 208 may direct the other beam toward an IQ modulator 211.

The IQ modulator 210 may be configured to modulate data associated with an electrical driving signal XI' (explained in further detail below) and an electrical driving signal XQ' (explained in further detail below) onto the beam received by the IQ modulator 210 to generate a first polarization component of a dual polarization (or polarization multiplexed) optical signal. Similarly, the IQ modulator 211 may be configured to modulate data associated with an electrical driving signal YI' (explained in further detail below) and an electrical driving signal YQ' (explained in further detail below) onto the beam received by the IQ modulator 211 to generate the second polarization component of the dual polarization (or polarization multiplexed) optical signal.

In the illustrated embodiment, the second polarization component may be directed toward a half-wave plate 213. The half-wave plate 213 may be configured to rotate the polarization of the second polarization component according to the DP-QPSK modulation scheme such that the polarization of the second polarization component may be substantially orthogonal to the polarization of the first polarization component. In the illustrated embodiment, the rotated second polarization component having data modulated thereon may have a Y-polarization orientation and may be referred to as a Y-polarization signal. The first polarization component with a polarization substantially orthogonal to the Y-polarization signal and having data modulated thereon may accordingly have an X-polarization orientation and may be referred to as an X-polarization signal. The X and Y polarization signals may be directed toward a polarization beam combiner (PBC) 214.

The PBC 214 may include any system, apparatus, or device configured to combine the X and Y polarization signals into a single optical signal with a carrier that includes both the X and Y polarization signals. Consequently, the beam of light leaving the PBC 214 may include an optical signal with X and Y polarization components that may respectively include the X and Y polarization signals. In the same or alternative embodiments, the modulated X and Y polarization signals may each be directed toward a return to zero (RZ) pulse carver (not expressly shown in FIG. 2) before being directed toward the PBC 214. In yet other embodiments, the RZ pulse carver may be included in the optical transmitter 202 before the splitter 208.

The electrical driving signals XQ', XI', YQ', and YI' may include main data 218 integrated with supervisory (SV) data 216. In the illustrated embodiment, the main data 218 may include X-polarization data, including in-phase X-polarization data (XI) and quadrature X-polarization data (XQ), as well as Y-polarization data, including in-phase Y-polarization data (YI) and quadrature Y-polarization data (YQ) in accordance with a DP-QPSK modulation scheme.

A processing unit 220 of the optical transmitter 202 may be configured to integrate the supervisory data 216 with the main data 218 that includes the X and Y polarization data, including XI, XQ, YI, and YQ, to generate driving signals XQ', XI', YQ', and YI' that include both the main data 218 and the supervisory data 216. The IQ modulator 210 may modulate driving signals XQ' and XI' onto the beam received by the IQ modulator 210 and The IQ modulator 211 may modulate driving signals YQ' and YI' onto the beam received by the IQ modulator 211 as described above.

The processing unit 220 may include any suitable system, apparatus, or device configured to perform operations of the processing unit 220, as described below. For example, the processing unit 220 may include a processor and one or more computer-readable storage media communicatively coupled to the processor. The one or more computer-readable storage media may include instructions for performing the operations of the processing unit 220 that may be read by the processor of the processing unit 220. Alternately or additionally, the processing unit 220 may include or be coupled to a digital-to-analog converter (DAC) such that a signal received by each of the IQ modulators 210 and 211 includes an analog signal.

In some embodiments of the present disclosure, the processing unit 220 may be configured to integrate supervisory data 216 with main data 218 in the electrical domain such that the modulation of supervisory data 216 onto an optical signal carrying main data 218 (as generated and emitted by the optical transmitter 202) is manifested as carrier polarization modulation, explained above with respect to FIG. 1B. For example, the processing unit 220 may be configured to perform operations to X and Y polarization data (e.g., XI, XQ, YI, and YQ) associated with main data 218 with respect to supervisory data 216 as a function of time to generate driving signals XI', XQ', YI', and YQ' that manifest carrier polariza tion modulation of supervisory data 216 based on the following equations:

A matrix representing polarization rotation of an optical signal ($R(\theta, \psi)$), where angles $\theta$ and $\psi$ may be a function of the supervisory data) may be expressed as:

$$R(\theta, \psi) = \begin{pmatrix} \cos\frac{\theta}{2} + i\sin\frac{\theta}{2}\cos(2\psi) & i\sin\frac{\theta}{2}\sin(2\psi) \\ i\sin\frac{\theta}{2}\sin(2\psi) & \cos\frac{\theta}{2} - i\sin\frac{\theta}{2}\cos(2\psi) \end{pmatrix}$$

The X-polarization data in the electrical domain ($E_X$) and Y-polarization data in the electrical domain ($E_Y$) may be expressed as:

$E_X = XI + iXQ, \; E_Y = YI + iYQ$

The polarization rotation in the electrical domain for the X-polarization data and the Y-polarization data ($E''_X$ and $E''_Y$) may be achieved by multiplying the polarization rotation matrix ($R(\theta, \psi)$) by a matrix that includes $E_X$ and $E_Y$ and may be expressed as:

$$\begin{pmatrix} E''_X \\ E''_Y \end{pmatrix} = R(\theta, \psi) \begin{pmatrix} E_X \\ E_Y \end{pmatrix}$$

In some embodiments, the processing unit 220 may linearize $E''_X$ and $E''_Y$ to compensate for nonlinearity of IQ modulators 210 and 211 by performing the following operations:

$$E'_X = \frac{2}{\pi}\sin^{-1}(Re(E''_X)) + i\frac{2}{\pi}\sin^{-1}(Im(E''_X))$$

$$E'_Y = \frac{2}{\pi}\sin^{-1}(Re(E''_Y)) + i\frac{2}{\pi}\sin^{-1}(Im(E''_Y))$$

The processing unit 220 may generate driving signals XI', XQ', YI', and YQ' by performing the following operations on $E'_X$ and $E'_Y$:

$XI'=Re(E'_X), XQ'=Im(E'_X), YI'=Re(E'_Y), YQ'=Im(E'_Y)$

As described above, the IQ modulators 210 and 211 may modulate driving signals XI', XQ', YI', and YQ' onto carriers associated with the optical signal. Therefore, the processing unit 220 may perform the above operations in the electrical domain that manifest as carrier polarization modulation of supervisory data 216 onto an optical signal.

In the same or alternative embodiments, the processing unit 220 may be configured to integrate supervisory data 216 with main data 218 in the electrical domain such that the modulation of supervisory data 216 onto an optical signal carrying main data 218 (as generated and emitted by the optical transmitter 202) is manifested as relative carrier phase modulation of orthogonal polarization components, explained above with respect to FIG. 1C. For example, the processing unit 220 may be configured to perform operations on X and Y polarization data (e.g., XI, XQ, YI, and YQ) associated with the main data 218 with respect to the supervisory data 216 as a function of time to generate driving signals XI', XQ', YI', and YQ' that manifest as relative carrier phase modulation of supervisory data 216 as described below.

The relative carrier phase difference ($\Delta\phi$, where $\Delta\phi$ may be function of the supervisory data) may be provided using the following processing operations:

$$XI'' + iXQ'' = [XI + iXQ]\exp\left[i\frac{\Delta\phi}{2}\right]$$

$$YI'' + iYQ'' = [YI + iYQ]\exp\left[-i\frac{\Delta\phi}{2}\right]$$

In some embodiments, the processing unit 220 may linearize XI'', XQ'', YI'', and YQ'', to compensate for nonlinearity of IQ modulators 210 and 211 to generate driving signals XI', XQ', YI', and YQ' by performing the following operations:

$$XI' = \frac{2}{\pi}\sin^{-1}[XI''], \quad XQ' = \frac{2}{\pi}\sin^{-1}[XQ'']$$

$$YI' = \frac{2}{\pi}\sin^{-1}[YI''], \quad YQ' = \frac{2}{\pi}\sin^{-1}[YQ'']$$

As described above, the IQ modulators 210 and 211 may modulate driving signals XI', XQ', YI', and YQ' onto carriers associated with the optical signal. Therefore, the processing unit 220 may perform the above operations in the electrical domain that manifest as relative carrier phase modulation of the supervisory data 216 onto an optical signal.

In the same or alternative embodiments, the processing unit 220 may be configured to integrate the supervisory data 216 with the main data 218 in the electrical domain such that the modulation of the supervisory data 216 onto an optical signal carrying the main data 218 (as generated and emitted by the optical transmitter 202) is manifested as relative carrier frequency modulation of orthogonal polarization components, explained above with respect to FIG. 1D. For example, the processing unit 220 may be configured to perform operations to X and Y polarization data (e.g., XI, XQ, YI, and YQ) associated with the main data 218 with respect to the supervisory data 216 as a function of time to generate driving signals XI', XQ', YI', and YQ' that manifest as relative carrier frequency modulation of supervisory data 216 as described below.

The relative carrier frequency difference (($\Delta f$), where $\Delta f$ may be a function of the supervisory data) may be provided using the following processing operations:

$$XI'' + iXQ'' = [XI + iXQ]\exp\left[i2\pi\frac{\Delta f}{2}t\right]$$

$$YI'' + iYQ'' = [YI + iYQ]\exp\left[-i2\pi\frac{\Delta f}{2}t\right]$$

In some embodiments, the processing unit 220 may linearize XI'', XQ'', YI'', and YQ'', to compensate for nonlinearity of the IQ modulators 210 and 211 to generate driving signals XI', XQ', YI', and YQ' by performing the following operations:

$$XI' = \frac{2}{\pi}\sin^{-1}[XI''], \quad XQ' = \frac{2}{\pi}\sin^{-1}[XQ'']$$

$$YI' = \frac{2}{\pi}\sin^{-1}[YI''], \quad YQ' = \frac{2}{\pi}\sin^{-1}[YQ'']$$

As described above, the IQ modulators 210 and 211 may modulate the driving signals XI', XQ', YI', and YQ' onto carriers associated with the optical signal. Therefore, the processing unit 220 may perform the above operations in the electrical domain that manifest as relative carrier frequency modulation of the supervisory data 216 onto an optical signal.

Accordingly, the optical transmitter 202 may be configured to generate an optical signal that includes the main data 218 and the supervisory data 216 for transmission in an optical network (e.g., the optical network 100 of FIG. 1). As described above, the optical transmitter 202 may modulate the supervisory data 216 in the electrical domain such that carrier polarization modulation, relative carrier phase modulation or relative carrier frequency modulation of the supervisory data 216 on the optical signal is manifested. Accordingly, the optical transmitter 202 may modulate the supervisory data 216 onto the optical signal without the addition of optical components, which may reduce the cost and/or complexity of implementing the above described modulations.

Modifications, additions, or omissions may be made to the optical transmitter 202 without departing from the scope of the present disclosure. For example, the optical transmitter 202 is described and illustrated as performing DP-QPSK modulation. However, the above described modulation of supervisory data 216 may be performed with any optical transmitter that may transmit an applicable polarization multiplexed or dual-polarization optical signal. Additionally, although the modulation of the supervisory data 216 is described as being performed in the electrical domain, an optical transmitter similar to the optical transmitter 202 may be configured to perform one or more of the above described modulations of supervisory data 216 in the optical domain, as explained in detail below with respect to FIGS. 3-5.

Figure 3:
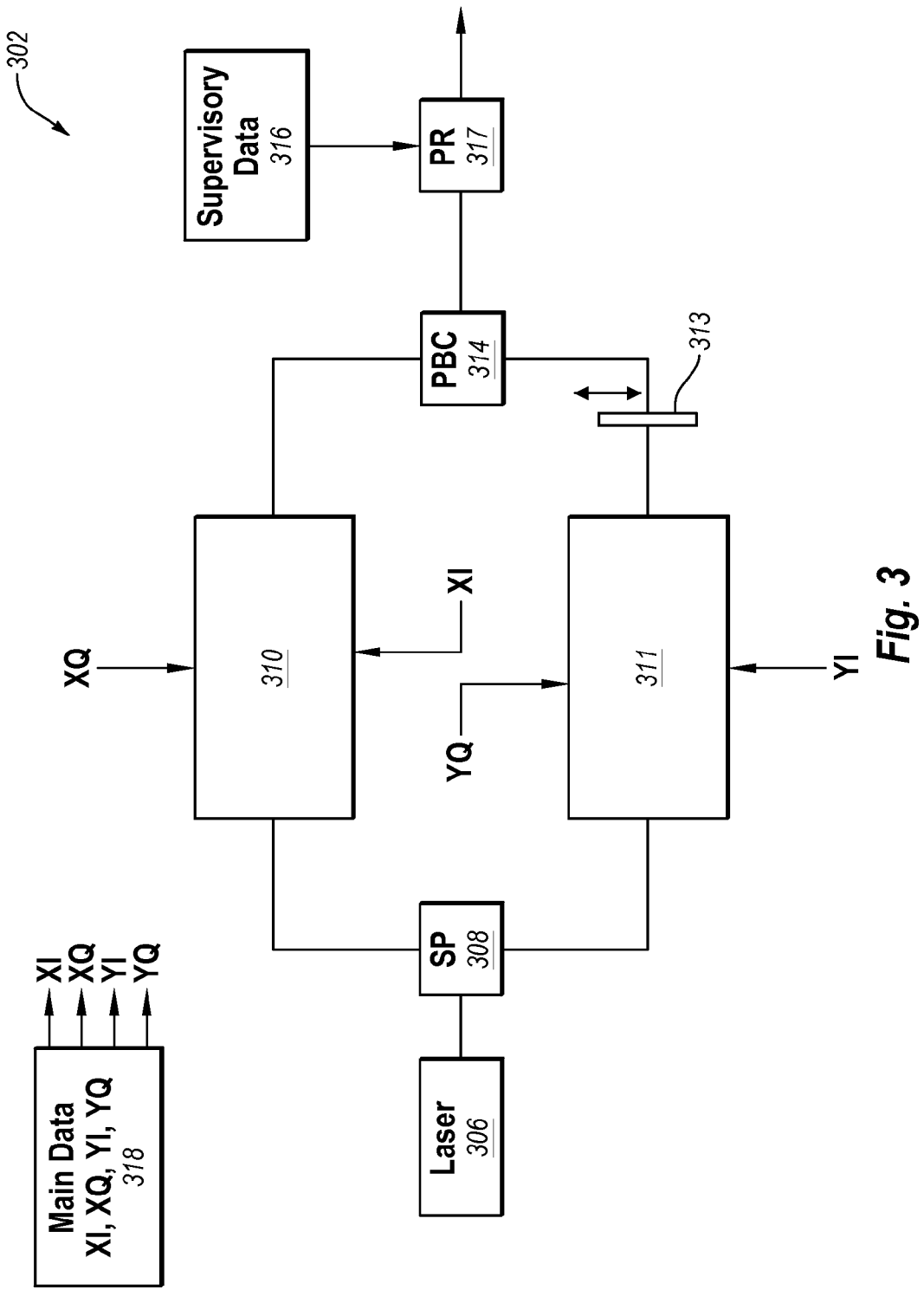
FIG. 3 illustrates an example embodiment of an optical transmitter configured to perform carrier polarization modulation in the optical domain.
Figure 4:
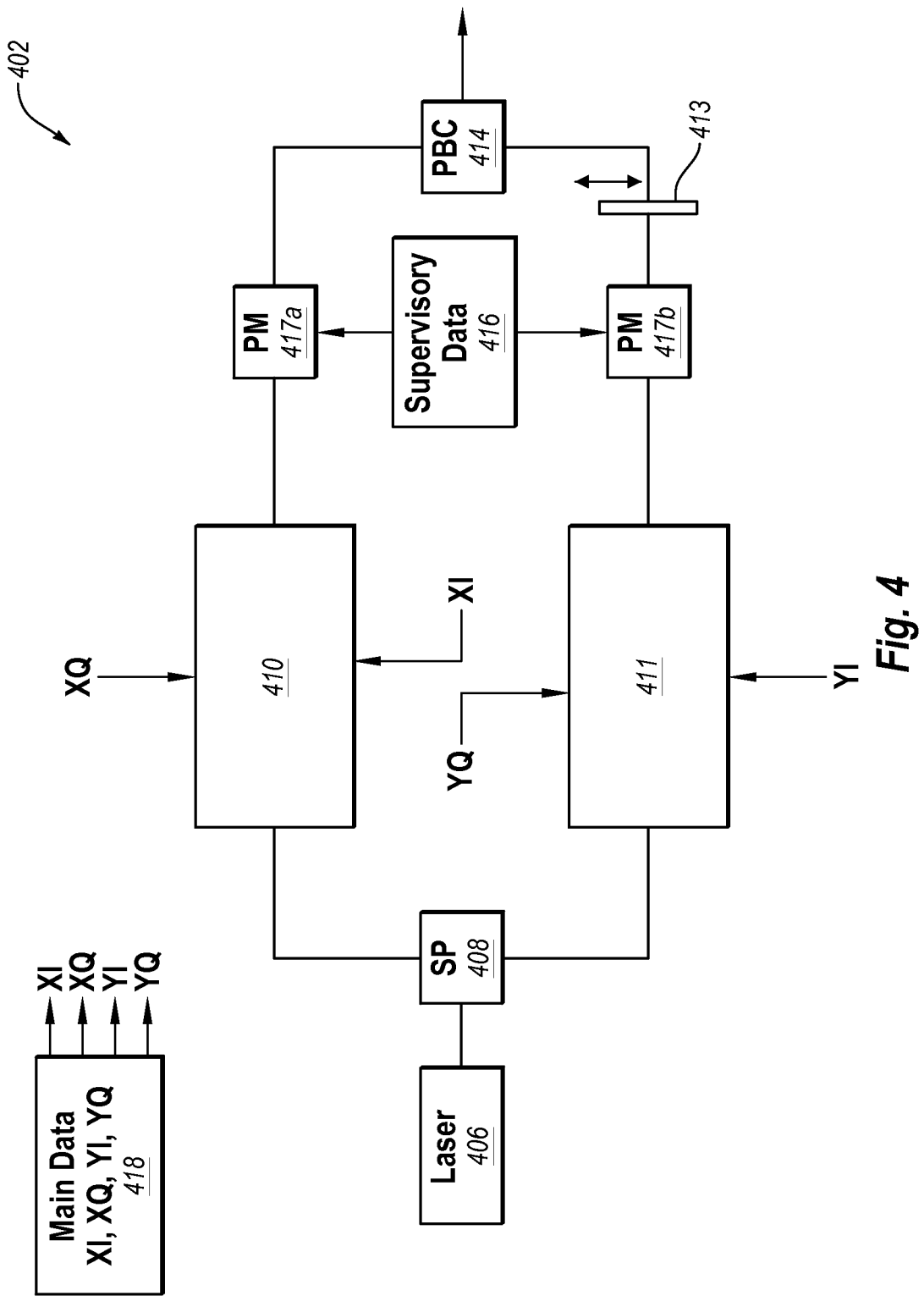
FIG. 4 illustrates an example embodiment of an optical transmitter configured to perform relative carrier phase modulation in the optical domain.
Figure 5:
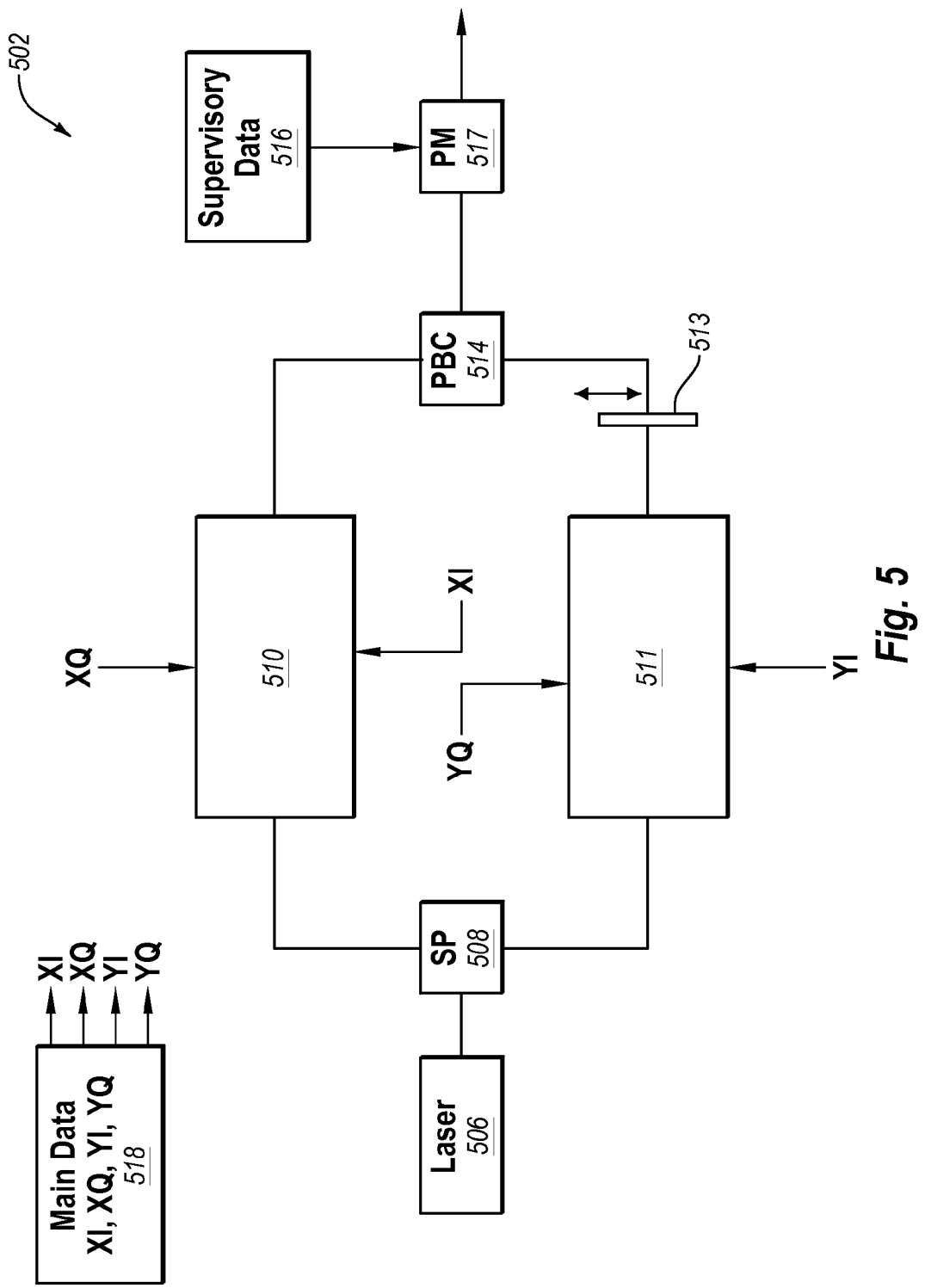
FIG. 5 illustrates another example embodiment of an optical transmitter configured to perform relative carrier phase modulation in the optical domain.

For example, FIG. 3 illustrates an example embodiment of an optical transmitter 302 configured to perform carrier polarization modulation of supervisory data 316 onto an optical signal in the optical domain, as detailed below. Further, FIGS. 4 and 5 illustrate example embodiments of optical transmitters 402, 502 configured to perform relative carrier phase modulation of supervisory data 416, 516 onto an optical signal in the optical domain, as detailed further below. One or more of the optical transmitters of the nodes 102 of FIG. 1A may each be implemented as any of the optical transmitters 302, 402, 502 of FIGS. 3-5, for example.

FIG. 3 illustrates an example embodiment of an optical transmitter 302 configured to perform carrier polarization modulation of supervisory data 316 in the optical domain, arranged in accordance with at least some embodiments of the present disclosure. The optical transmitter 302 may be configured to perform DP-QPSK modulation and may include a laser 306, a splitter (SP) 308, IQ modulators 310 and 311, a half-wave plate 313 and a PBC 314 substantially similar in operation and arrangement as the laser 206, the splitter 208, the IQ modulators 210 and 211, the half-wave plate 213, and PBC 214, respectively, as described above with respect to FIG. 2. However, as described below, the optical transmitter 302 may be configured to perform polarization modulation of supervisory data 316 onto an optical signal in the optical domain and not the electrical domain.

The optical transmitter 302 of FIG. 3 may include a polarization rotator 317 configured to receive from the PBC 314 an optical signal with X and Y polarization components that may include X and Y polarization signals modulated with main data 318. In alternative embodiments, the polarization rotator 317 may be outside of the optical transmitter 302. The polarization rotator 317 may also be configured to receive supervisory data 316. The polarization rotator 317 may be configured to rotate the polarization orientation of the carrier of the optical signal received from the PBC 314 based on the supervisory data 316. Accordingly, the supervisory data 316 may be modulated onto the optical signal by the polarization rotator 317 adjusting the polarization orientation of the carrier of the optical signal. As mentioned above with respect to FIG. 1B, the modulation rate of the supervisory data 316 onto the optical signal may be substantially slower than the modulation rate of the main data 318 of the optical signal, but may also be substantially faster than a potential random polarization rotation rate that may be caused by environmental perturbations of the optical network.

Modifications, additions, or omissions may be made to FIG. 3 without departing from the scope of the present disclosure. For example, the optical transmitter 302 may include other components not expressly shown (e.g., a processing unit configured to control various operations of the optical transmitter 302). Additionally, although described in the context of performing DP-QPSK modulation, the optical transmitter 302 may be configured to perform carrier polarization modulation on any suitable polarization multiplexed or dual-polarization optical signal.

As mentioned above, FIG. 4 illustrates an example embodiment of an optical transmitter 402 configured to perform relative carrier phase modulation of supervisory data 416 in the optical domain, arranged in accordance with at least some embodiments of the present disclosure. The optical transmitter 402 may be configured to perform DP-QPSK modulation and may include a laser 406, a splitter (SP) 408, IQ, modulators 410 and 411, a half-wave plate 413 and a PBC 414 substantially similar in operation and arrangement as the laser 206, the splitter 208, the IQ modulators 210 and 211, the half-wave plate 213, and the PBC 214, respectively, of the optical transmitter 202 described above with respect to FIG. 2. However, as described below, the optical transmitter 402 may be configured to perform relative carrier phase modulation of supervisory data 416 onto an optical signal in the optical domain and not the electrical domain.

The optical transmitter 402 of FIG. 4 may include a phase modulator (PM) 417a and a phase modulator (PM) 417b. The phase modulator 417a may be configured to receive a first polarization component from the IQ modulator 410 after it has been modulated with X-polarization data, including XI and XQ of main data 418. Similarly, the phase modulator 417b may be configured to receive a second polarization component from the IQ modulator 411 after it has been modulated with Y-polarization data, including YI and YQ of the main data 418.

The phase modulators 417a and 417b may also be configured to receive supervisory data 416 and may be configured to adjust the carrier phase of the first polarization component and the second polarization component, respectively, based on the supervisory data 416 such that the relative carrier phase between the first polarization component and the second polarization component changes according to the supervisory data 416 (as described above with respect to FIG. 1B). Similar to as described above with respect to FIG. 2, the first polarization component modulated with X-polarization data and the supervisory data 416 may have an X-polarization and may be referred to as an X-polarization signal. Additionally, similar to as described above with respect to FIG. 2, the second polarization component modulated with Y-polarization data and the supervisory data 416 may be rotated by the half-wave plate 413 to have a Y-polarization and may be referred to as a Y-polarization signal.

The X-polarization signal and Y-polarization signal may be combined by the PBC 414 into an optical signal having X and Y polarization components that include the X and Y polarization signals. The X and Y polarization components of the optical signal may accordingly have a relative carrier phase difference that may be based on the supervisory data 416. Therefore, the phase modulators 417a and 417b may be configured to perform relative carrier phase modulation of the supervisory data 416.

Similarly as described above with respect to the supervisory data 216 of FIG. 2, the modulation rate of the supervisory data 416 may be substantially slower than the modulation rate of the main data 418. Therefore, the transmission of the supervisory data 416 on the optical signal may cause little to no interference with the transmission of the main data 418 on the optical signal.

Modifications, additions, or omissions may be made to FIG. 4 without departing from the scope of the present disclosure. For example, the optical transmitter 402 may include other components not expressly shown (e.g., a processing unit configured to control various operations of the optical transmitter 402). Additionally, although described in the context of performing DP-QPSK modulation, the optical transmitter 402 may be configured to perform carrier polarization modulation on any suitable polarization multiplexed or dual-polarization optical signal.

FIG. 5 illustrates an example embodiment of another optical transmitter 502 configured to perform relative carrier phase modulation of supervisory data 516 in the optical domain, arranged in accordance with at least some embodiments of the present disclosure. The optical transmitter 502 may be configured to perform DP-QPSK modulation and may include a laser 506, a splitter (SP) 508, IQ modulators 510 and 511, a half-wave plate 513 and a PBC 514 substantially similar in operation and arrangement as the laser 206, the splitter 208, the IQ modulators 210 and 211, the half-wave plate 213, and the PBC 214, respectively, of the optical transmitter 202 described above with respect to FIG. 2.

As described below, the optical transmitter 502 may be configured to perform relative carrier phase modulation of supervisory data 516 onto an optical signal in the optical domain and not the electrical domain, similar to the optical transmitter 402 of FIG. 4. However, the optical transmitter 502 may be configured to modulate the supervisory data 516 onto the optical signal after combination of the X and Y polarization signals by the PBC 514. In contrast, as explained above, the optical transmitter 402 of FIG. 4 may be configured to modulate the supervisory data 416 onto the carrier of each of the X and Y polarization signals before combination of the X and Y polarization signals by the PBC 414 of the optical transmitter 402 of FIG. 4

The optical transmitter 502 of FIG. 5 may include a polarization dependent phase modulator (PM) 517 configured to receive from the PBC 514 the combined optical signal that is modulated with main data 518. The polarization dependent phase modulator 517 may also be configured to receive supervisory data 516. The polarization dependent phase modulator 517 may be configured to adjust the phase of the carrier at least one of the X-polarization component and the Y-polarization component of the optical signal based on the supervisory data 516 such that the relative carrier phase between the X-polarization component and the Y-polarization component changes based on the supervisory data 516. Accordingly, the polarization dependent phase modulator 517 may be configured to perform relative carrier phase modulation of the supervisory data 516.

Similarly as described above with respect to the supervisory data 216 of FIG. 2, the modulation rate of the supervisory data 516 may be substantially slower than the modulation rate of the main data 518. Therefore, the transmission of the supervisory data 516 on the optical signal may cause little to no interference with the transmission of the main data 518 on the optical signal.

Modifications, additions, or omissions may be made to FIG. 5 without departing from the scope of the present disclosure. For example, the optical transmitter 502 may include other components not expressly shown (e.g., a processing unit configured to control various operations of the optical transmitter 502). Additionally, although described in the context of performing DP-QPSK modulation, the optical transmitter 502 may be configured to perform carrier polarization modulation on any suitable polarization multiplexed or dual-polarization optical signal.

Figure 6:
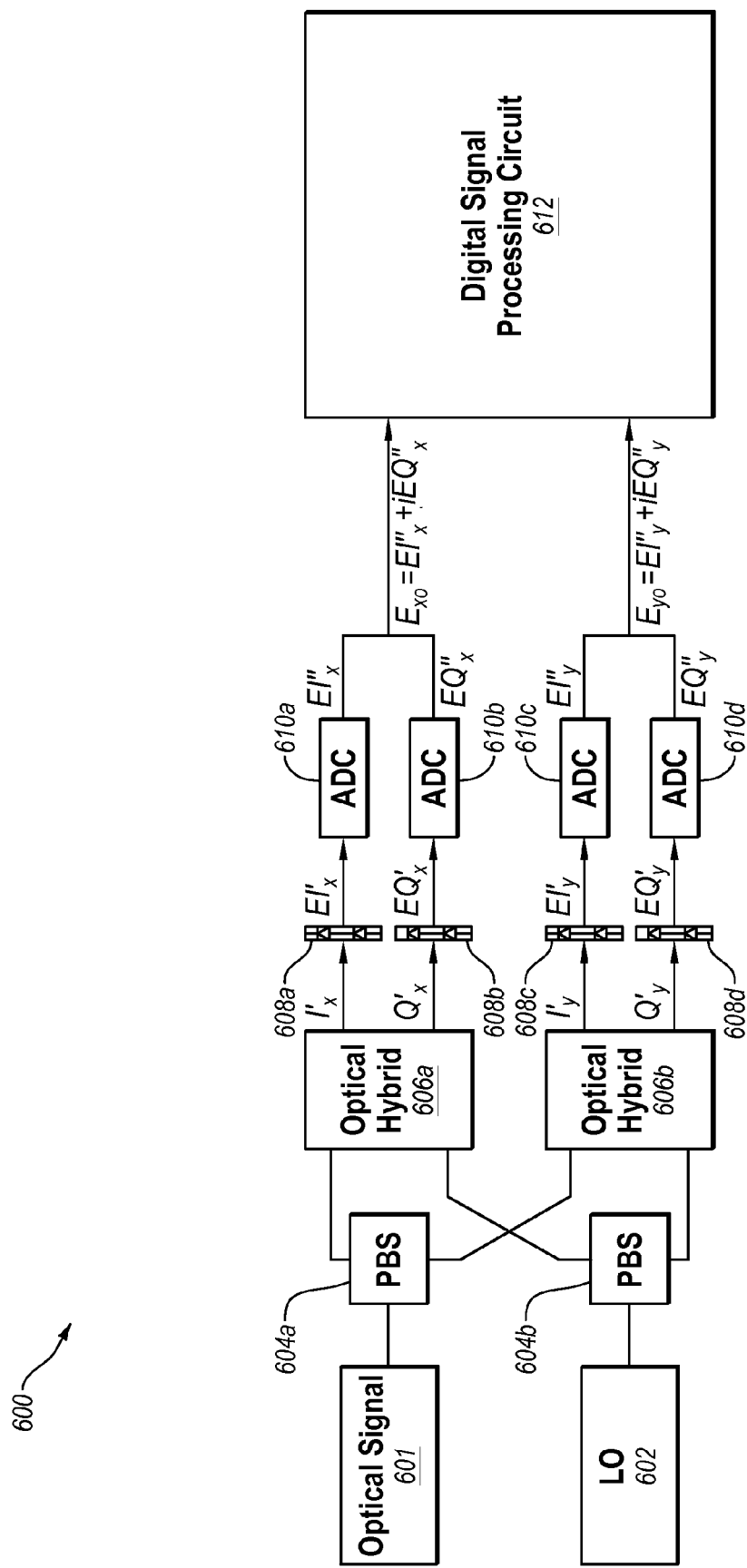
FIG. 6 illustrates an example embodiment of a coherent optical receiver configured to demodulate supervisory data from an optical signal.

As mentioned above, nodes of an optical network such as the nodes 102 of the optical network 100 of FIG. 1 may also include optical receivers configured to extract (e.g., demodulate) supervisory data from an optical signal that has been modulated using carrier polarization modulation, relative carrier phase modulation, or relative carrier frequency modulation. FIG. 6 illustrates an example embodiment of a coherent optical receiver 600 configured to demodulate supervisory data from an optical signal, arranged in accordance with at least some embodiments of the present disclosure. One or more of the receivers of the nodes 102 of FIG. 1A may each be implemented as the coherent optical receiver 600, for example. The illustrated embodiment of the coherent optical receiver 600 is configured to perform demodulation of a DP-QPSK optical signal. However, the same principles for performing demodulation of supervisory data from an optical signal may be applied with respect to any applicable coherent optical receiver configured to perform demodulation of a polarization multiplexed or dual-polarization optical signal.

The coherent optical receiver 600 may include a PBS 604a configured to receive an optical signal 601 and to split the optical signal according to its orthogonal X' and Y' polarization components to separate the respective X' and Y' polarization signals from the optical signal. The prime symbol (') indicates that the actual polarization orientation of the X' and Y' polarization signals received at the optical receiver 600 with respect to the X and Y polarization signals emitted by a transmitter may be different due to polarization rotation of the optical signal in optical fiber transmission lines of the optical network.

The PBS 604a may direct the X'-polarization signal toward an optical hybrid 606a and may direct the Y'-polarization signal toward an optical hybrid 606b. The coherent optical receiver 600 may also include a local oscillator (LO) 602 configured to generate a reference signal. A PBS 604b may be optically coupled to the local oscillator 602 and may be configured to receive the reference signal and to split the reference signal into orthogonal X' and Y' polarization components of the reference signals. The PBS 604b may direct the X'-polarization component of the reference signal toward the optical hybrid 606a and may direct the Y'-polarization component of the reference signal toward the optical hybrid 606b.

The optical hybrid 606a may be configured to mix the X'-polarization component of the reference signal with each of the I and Q channel signals included with the X'-polarization signal of the optical signal to generate mixed X'-polarization I and Q channel signals ($I_x'$ and $Q_x'$). The optical hybrid 606a may direct $I_x'$ and $Q_x'$ to balanced detectors 608a and 608b, respectively. Similarly, the optical hybrid 606b may be configured to mix the Y'-polarization component of the reference signal with the I and Q channel signals of the Y'-polarization signal of the optical signal to generate mixed Y'-polarization I and Q channel signals ($I_y'$ and $Q_y'$). The optical hybrid 606b may direct $I_y'$ and $Q_y'$ to balanced detectors 608c and 608d, respectively.

Each of the balanced detectors 608a-608d may include any suitable system, apparatus, or device, configured to convert $I_x'$, $Q_x'$ $I_y'$, and $Q_y'$ respectively, into electrical signals ($EI_x'$, $EQ_x'$, $EI_y'$, and $EQ_y'$, respectively) associated with the different X' and Y' polarization I and Q channel optical signals. For example, each of the balanced detectors 608a-608d may include photodiodes configured to receive optical signals and to generate electrical signals based on the received optical signals.

The coherent optical receiver 600 may also include analog-to-digital converters (ADCs) 610a-610d communicatively coupled to balanced detectors 608a-608d, respectively. Each of the ADCs 610a-610d may include any suitable system, apparatus, or device configured to convert electrical signals $EI_x'$, $EQ_x'$, $EI_y'$, and $EQ_y'$ (all of which may be analog signals), respectively, generated by the balanced detectors 608a-608d, respectively, into digital signals $EI_x''$, $EQ_x''$, $EI_y''$, and $EQ_y''$, respectively.

The coherent optical receiver 600 may combine $EI_x''$ and $EQ_x''$ to generate an X'-polarization electrical signal $E_{xo}$ that may be expressed by the following equation:

$$E_{xo} = EI_x'' + iEQ_x''.$$

Similarly, the coherent optical receiver 600 may combine $EI_y''$ and $EQ_y''$ to generate a Y'-polarization electrical signal $E_{yo}$ that may be expressed by the following equation:

$$E_{yo} = EI_y'' + iEQ_y''.$$

$E_{xo}$ and $E_{yo}$ may each be received by a digital signal processing (DSP) circuit 612 that may be configured to extract supervisory data encoded in $E_{xo}$ and $E_{yo}$ based on carrier polarization modulation, relative carrier phase modulation and/or relative carrier frequency modulation described above.

As mentioned above, in some embodiments of the present disclosure, the DSP circuit 612 may be configured to demodulate supervisory data modulated using carrier polarization modulation. For example, as detailed above, carrier polarization modulation may be performed by rotating the polarization of the optical signal 601. An adaptive equalizer of the DSP circuit 612 may be configured to compensate for polarization rotation of the optical signal 601 by adjusting the tap coefficients of a Finite Impulse Response (FIR) filter of the adaptive equalizer. The DSP circuit 612 may be configured to determine the polarization rotation based on the FIR filter coefficients. Therefore, the DSP circuit 612 may be configured to determine an average polarization rotation over a period of time associated with the symbol period of the supervisory data such that the determined average polarization rotation indicates the carrier polarization modulation of the supervisory data. Consequently, in some embodiments of the present disclosure, the DSP circuit 612 may be configured to perform demodulation of carrier polarization modulation of supervisory data based on polarization rotation analysis and compensation of the optical signal 601 performed by the adaptive equalizer of the DSP circuit 612.

Additionally, in some embodiments, the DSP circuit 612 may be configured to demodulate supervisory data modulated using relative carrier phase modulation. As discussed above, relative carrier phase modulation may be performed by adjusting the relative carrier phase between the X' and Y' polarization components of the optical signal 601. Accordingly, the DSP circuit 612 may be configured to determine the relative carrier phase difference between the X' and Y' polarization signals of the optical signal 601 to demodulate supervisory data modulated using relative carrier phase modulation.

For example, the DSP circuit 612 may be configured to perform the following operations described below on digital signals $E_x(n)$ and $E_y(n)$ to estimate the relative carrier phase difference between the X' and Y' polarization signals of the optical signal 601 ($\Delta\phi$) associated with the modulation of the supervisory data. $E_x(n)$ and $E_y(n)$ may be the digital signals that leave the adaptive equalizer of the DSP circuit 612 and may represent the X' and Y' polarizations, respectively, of the optical signal 601. The following example is given with respect to a DP-MPSK (e.g., DP-QPSK, DP-8PSK, DP-16PSK etc.) signal, but may be altered as known in the art to apply to DP-MQAM (e.g., DP-QAM, DP-8QAM, DP-16QAM, etc.) signals as well.

In the analysis below, it may be assumed that the offset frequency ($f_o$) of the optical signal 601 with respect to the local oscillator 602 is substantially the same for the X' and Y' polarizations. For relative carrier phase demodulation, $E_x(n)$ and $E_y(n)$ may be expressed as complex signals (with one sample of $E_x(n)$ and $E_y(n)$ per symbol period of the main data of the optical signal ($T_d$)) by the following equations:

$$E_x(n) = A_{x,n} \exp[i(2\pi f_o t_n + \phi_{dx,n} + \Delta\phi/2 + \theta_{x,n})]$$

$$E_y(n) = A_{y,n} \exp[i(2\pi f_o t_n + \phi_{dy,n} - \Delta\phi/2 + \Delta_{y,n})]$$

In the above equations "n" may represent the index of the digital signal, "t" may represent time, "A" may represent the amplitude of the respective polarization component, "$\phi$" may represent the main data of the optical signal 601, "$\theta_{x,n}$" and "$\theta_{y,n}$" may represent Additive White Gaussian Noise (AWGN) or intersymbol interference, and, as mentioned above, "$\Delta\phi$" may represent the carrier phase difference between the X' and Y' polarization signals added based on the relative carrier phase modulation of the supervisory data. Using the above representations of $E_x(n)$ and $E_y(n)$, $\Delta\phi$ may be determined by performing the following operations:

$$S(n) = \left[\frac{E_x(n) E_y^*(n)}{|E_x(n) E_y(n)|}\right]^M = \exp[i(M(\varphi_{dx,n} - \varphi_{dy,n}) + M\Delta\phi + M(\theta_{x,n} - \theta_{y,n}))] = $$
$$\exp[i(M\Delta\phi + M(\theta_{x,n} - \theta_{y,n}))]$$

In the above equations, "M" may represent the order of the modulation scheme (e.g., four for DP-QPSK, eight for DP-8PSK, etc.) and $M(\phi_{dx,n} - \phi_{dy,n}) = 2\pi m$, where "m" is an integer. The phase difference between the X' and Y' polarizations ($\Delta\phi$) associated with the in-band supervisory data modulation may be estimated by averaging the complex digital signal ($S(n)$) over a block size "L" associated with a number of samples "n" of the main data for the symbol period of the supervisory data expressed below as the noise term is averaged out and $\delta\Delta\phi \ll 1$ (which may represent the low speed SV data modulation and low speed rising and falling time with respect to the baud rate of the main data):

$$\Delta\phi \approx \frac{1}{M} \text{angle}\left[\sum_n^L w_n S(n)\right]$$

In the above equation, "$w_n$" may represent a weighting factor that may be applied to the equation to improve the estimation of Δφ and may be "1" in embodiments where there may be not weighting factor. Additionally, in the above equation, "angle" may represent a phase calculation of the complex signal S(n).

Therefore, the DSP circuit 612 may be configured to determine the relative carrier phase difference between the X' and Y' polarization components of the optical signal 601 that may be created by the relative carrier phase modulation of the supervisory data. Accordingly, the DSP circuit 612 may be configured to demodulate the supervisory data modulated according to relative carrier phase modulation based on the determined relative carrier phase difference between the X' and Y' polarization components.

Additionally, in some embodiments, the DSP circuit 612 may be configured to demodulate supervisory data modulated using relative carrier frequency modulation. As discussed above, relative carrier frequency modulation may be performed by adjusting the relative carrier frequency between the X' and Y' polarization components of the optical signal 601. Accordingly, the DSP circuit 612 may be configured to determine the relative carrier frequency difference between the X' and Y' polarization components of the main data of the optical signal 601 to demodulate supervisory data modulated using relative carrier frequency modulation.

For example, the DSP circuit 612 may be configured to perform the following operations described below on digital signals $E_x(n)$ and $E_y(n)$ to estimate the relative carrier frequency difference (Δf) between the X' and Y' polarization components of the optical signal 601 associated with the modulation of the supervisory data. As with relative carrier phase demodulation, $E_x(n)$ and $E_y(n)$ may be the digital signals that leave the adaptive equalizer in the DSP circuit 612 and may represent the X' and Y' polarization signals, respectively, of the optical signal 601. The following example is given with respect to a DP-MPSK signal, but may be altered as known in the art to apply to DP-MQAM signals as well.

In the analysis below, for relative carrier frequency demodulation, $E_x(n)$ and $E_y(n)$ may be expressed as complex signals (with one sample of $E_x(n)$ and $E_y(n)$ per symbol period of the main data of the optical signal ($T_d$)) by the following equations:

$$E_x(n) = A_{x,n}\exp\left[i\left(2\pi f_o t_n + \varphi_{dx,n} + 2\pi\frac{\Delta f}{2} + \theta_{x,n}\right)\right]$$

$$E_y(n) = A_{y,n}\exp\left[i\left(2\pi f_o t_n + \varphi_{dy,n} - 2\pi\frac{\Delta f}{2} + \theta_{y,n}\right)\right]$$

In the above equations "n" may represent the index of the digital signal, "t" may represent time, "A" may represent the amplitude of the respective polarization component, "φ" may represent the main data of the optical signal 601, "$\theta_{x,n}$" and "$\theta_{y,n}$" may represent Additive White Gaussian Noise (AWGN) or intersymbol interference, and, as mentioned above, "Δf" may represent the carrier frequency difference between the X' and Y' polarization signals added based on the relative carrier frequency modulation of the supervisory data. Using the above representations of $E_x(n)$ and $E_y(n)$, Δf may be determined by performing the following operations:

$$S(n) = \left[\frac{E_x(n)E_y^*(n)}{|E_x(n)E_y(n)|}\right]^M =$$

$$\exp[i(2\pi M\Delta f t_n + M(\varphi_{dx,n} - \varphi_{dy,n}) + M(\theta_{x,n} - \theta_{y,n}))] =$$

$$\exp[i(2\pi M\Delta f t_n + M(\theta_{x,n} - \theta_{y,n}))]$$

In the above equations, "M" may represent the order of the modulation scheme (e.g., four for DP-QPSK, eight for DP-8PSK, etc.) and $M(\varphi_{dx,n} - \varphi_{dy,n}) = 2\pi m$, where "m" is an integer. If $2\pi M\Delta f(t_{n+L} - t_n) \ll 1$ (e.g., Δf≈10 MHz, Δt≈40 picoseconds, M=4, and L=40) then $2\pi M\Delta f t_n$ may be estimated based on the following equation:

$$2\pi M\Delta f t_n \approx \text{angle}\left[\sum_n^L w_n S(n)\right]$$

In the above equation, "$w_n$" may represent a weighting factor that may be applied to the equation to improve the estimation of Δφ and may be given a value of "1" in instances where there may be no weighting factor. Additionally, "angle" may represent a phase calculation of the complex signal S(n). Additionally, "M" and "$t_n$" may be known, such that "Δf" may be determined.

Therefore, in some embodiments the DSP circuit 612 may be configured to determine the relative carrier frequency difference between the X' and Y' polarization components of the optical signal 601 that may be created by the relative carrier frequency modulation of the supervisory data. Accordingly, the DSP circuit 612 may be configured to demodulate the supervisory data modulated according to relative carrier frequency modulation based on the determined relative carrier frequency difference between the X' and Y' polarization components.

Accordingly, as described above, the coherent optical receiver 600 may include a DSP circuit 612 configured to demodulate supervisory data modulated on the optical signal 601 with carrier polarization modulation, relative carrier phase modulation, and/or relative carrier frequency modulation. Such a configuration may allow for demodulation of the supervisory data without incorporating additional optical components, which may reduce the cost of implementing at least one of the carrier polarization modulation, relative carrier phase modulation and/or relative carrier frequency modulation of supervisory data.

Modifications, additions, or omissions may be made to the coherent optical receiver 600 without departing from the scope of the present disclosure. For example, the coherent optical receiver 600 is described with respect to receiving and performing operations on a DP-QPSK optical signal, however, the above principles may be applied with respect to any suitable polarization multiplexed or dual-polarization optical signal. Further, the number of components described and their operations are for exemplary purposes only. The listed components of the coherent optical receiver 600 may perform any number of other operations not specifically enumerated. Further, the coherent optical receiver 600 may include any number of additional components configured to perform any number of operations.

In some embodiments of the present disclosure, an SV detector may be configured to perform demodulation of relative carrier frequency modulation. The relatively slow modulation rate of the supervisory data may allow the SV detector to include low-speed photodetectors and electronics as compared to an optical transmitter configured to receive and demodulate main data. Accordingly, the SV detector may have a relatively low implementation cost. The SV detector may be included with an optical receiver or may be a separate and independent component of the optical network.

Figure 7:
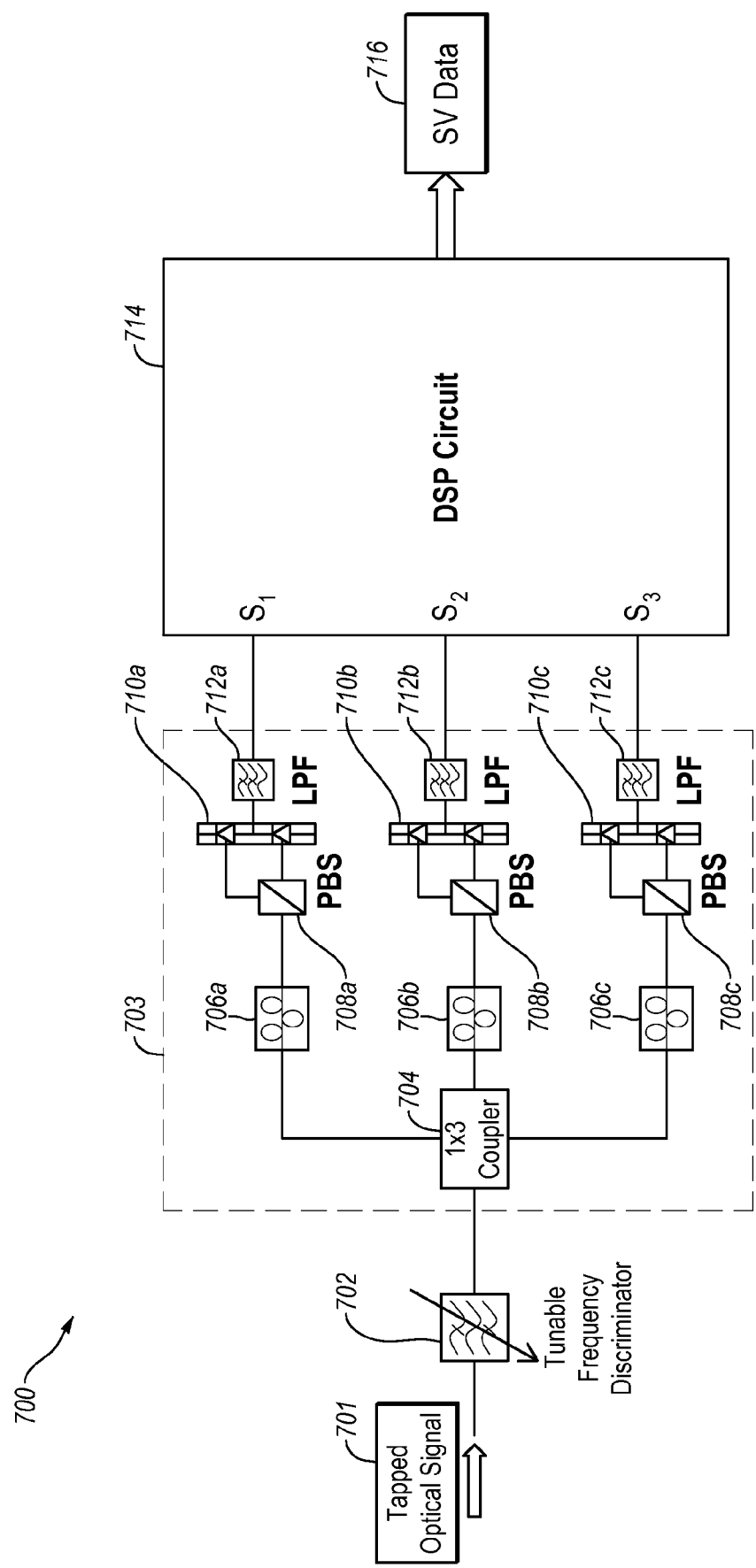
FIG. 7 illustrates an example configuration of a supervisory data detector (SV detector) configured to demodulate relative carrier frequency modulation.

FIG. 7 illustrates an example configuration of an SV detector 700 that may be configured to demodulate the relative carrier frequency modulation, arranged in accordance with at least some embodiments of the present disclosure. The SV detector 700 may be configured to receive an optical signal and may tap a portion of the received optical signal to obtain a tapped optical signal 701. The SV detector 700 may be configured to direct the tapped optical signal 701 toward a tunable frequency discriminator 702.

The tunable frequency discriminator 702 may be tuned to the wavelength range of a channel associated with the tapped optical signal 701 that may include supervisory data (SV data) 716 encoded therein. The tunable frequency discriminator 702 may be a type of filter that may have a slope in the frequency domain such that the output power of the tunable frequency discriminator 702 may depend on the input frequency. Accordingly, the tunable frequency discriminator 702 may be configured to convert the relative carrier frequency modulation of the supervisory data 716 into relative amplitude modulation. Therefore, the relative carrier frequency modulation may be expressed as relative amplitude modulation where differences in the amplitudes between X' and Y' polarization components of the tapped optical signal 701 after passing through the tunable frequency discriminatory may indicate the relative frequency modulation of the supervisory data 716. The tunable frequency discriminator 702 may be configured to direct the tapped optical signal 701 toward the polarimeter 703.

The polarimeter 703 may be configured to divide the tapped optical signal 701 according to its horizontal and vertical (horizontal/vertical) polarization components, plus and minus (+/−) forty-five degree ($\pi/4$) polarization components, and left and right (left/right) circular polarization components in the optical domain.

For example, the polarimeter 703 may include a 1×3 coupler 704 configured to receive the tapped optical signal 703 from the tunable frequency discriminator 702 and to split the tapped optical signal 703 into three signals. The polarimeter 703 may direct one of the three optical signals toward a polarization controller 706a, a PBS 708a, a detector 710a and a low-pass filter (LPF) 712a configured to detect the horizontal/vertical polarization components of the tapped optical signal 701 and to generate electrical signals representing the horizontal and vertical polarization components of the tapped optical signal 701. A polarization controller 706b, a PBS 708b, a detector 710b and an LPF 712b may be analogously configured to receive another of the three optical signals split from the tapped optical signal 701 to detect the +/− forty-five degree polarization components of the tapped optical signal 701 and to generate electrical signals representing the plus and minus forty-five degree polarization components. Additionally, a polarization controller 706c, a PBS 708c, a detector 710c and an LPF 712c may be analogously configured to receive the other of the three optical signals split from the tapped optical signal 701 to detect the left/right circular polarization components of the tapped optical signal 701 and to generate electrical signals representing the left and right circular polarization components.

A signal processing circuit 714 (depicted as a DSP in FIG. 7) of the SV detector 700 may be configured to receive the electrical signals representing the horizontal/vertical polarization components, the +/− forty-five degree polarization components, and the left/right circular polarization components from the polarimeter. The signal processing circuit 714 may be configured to determine a difference between the power of the horizontal/vertical polarization components, a difference between the power of the +/− forty-five degree polarization components, and/or a difference between the power of the left/right circular polarization components as received from the polarimeter 703.

As discussed above, the tunable frequency discriminator 702 may convert the relative carrier frequency modulation into relative amplitude modulation such that at least one of the power differences between the different polarization components (e.g., horizontal/vertical, +/− forty-five degrees, and left/right circular) may indicate the difference in carrier frequency associated with the X' and Y' polarization components of the tapped optical signal 701. Therefore, at least one of the power differences between the different polarization components divided by the polarimeter 703 may indicate the supervisory data (SV data 716) modulated onto the tapped optical signal 701 using relative carrier frequency modulation.

Additionally, and similar to the DSP circuit 612 of FIG. 6, in some embodiments the signal processing circuit 714 may sum the power differences between the horizontal/vertical polarization components, the +/− forty-five degree polarization components, and the left/right circular polarization components to determine the frequency difference (as manifested by the differences in power generated by the tunable frequency discriminator 702) between the X' and Y' polarization components of the tapped optical signal 701. In such embodiments, the signal processing circuit 714 may adjust the weighting factor applied to at least one of the power differences between the horizontal/vertical polarization components, the +/− forty-five degree polarization components, and the left/right circular polarization components during the summation to better represent the orientation of the X' and Y' polarization components such that the carrier frequency difference between the X' and Y' polarization components may be more accurately determined. In some embodiments, the weighting factor may be determined based on an eye opening associated with the tapped optical signal 701 where the eye opening may improve as the weighting factor more accurately indicates the orientation of the X' and Y' polarization components of the optical signal 701. Additionally, in some embodiments, these weighting factors may be updated regularly to compensate for random polarization drift of the optical signal during transmission due to environmental perturbations in the optical network.

Therefore, in some embodiments of the present disclosure, the SV detector 700 may include a tunable frequency discriminator 702, a polarimeter 703 and a signal processing circuit 714 configured to perform demodulation of relative carrier frequency modulation of supervisory data 716. Modifications, additions, or omissions may be made to the SV detector 700 of FIG. 7 without departing from the scope of the present disclosure. For example, although the detectors 710a-710c are depicted as balanced detectors, in other embodiments one or more of the detectors 710a-710c may be single ended detectors. Additionally, the SV detector 700 may include other components configured to perform other operations than those explicitly described.

Figure 8:
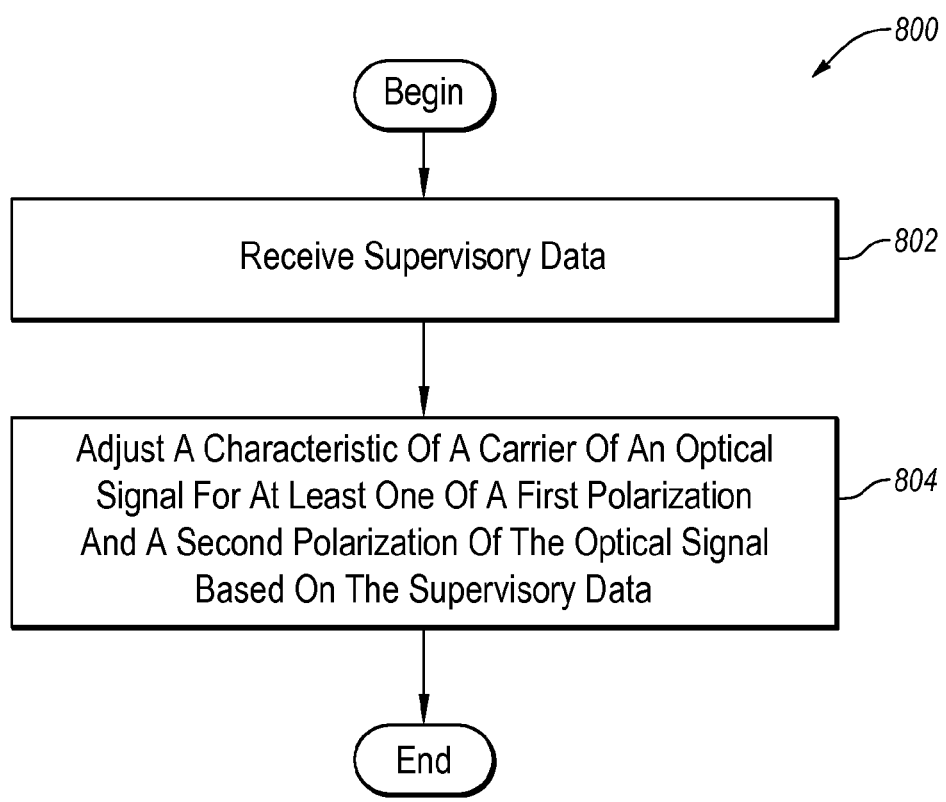
FIG. 8 is a flow chart of an example method of modulating supervisory data onto an optical signal, all arranged in accordance with some embodiments of the present disclosure.

FIG. 8 is a flow chart of an example method 800 of modulating supervisory data onto an optical signal, arranged in accordance with at least some embodiments of the present disclosure. The method 800 may be implemented by any suitable component of an optical network such as any one of the optical transmitters 202, 302, 402 and 502 described above. Although illustrated as discrete steps, various steps of the method 800 may be divided into additional steps, combined into fewer steps, or eliminated, depending on the desired implementation. Additionally, the order of performance of the different steps may vary depending on the desired implementation.

The method 800 may begin at step 802, where an optical transmitter may receive supervisory data that is to be modulated onto an optical signal. At step 804, the optical transmitter may adjust a characteristic of a carrier of the optical signal for at least one of a first polarization and a second polarization of the optical signal based on the supervisory data.

For example, for carrier polarization modulation, the optical transmitter may adjust the polarization orientation of the carrier of the optical signal based on the supervisory data such that the overall polarization orientation of the carrier on a Poincaré sphere changes based on the supervisory data, as described above with respect to FIG. 1B. For relative carrier phase modulation, the optical transmitter may adjust the carrier phase of at least one of the X-polarization and the Y-polarization of the optical signal based on the supervisory data such that the relative difference between the carrier phases of the X-polarization and the Y-polarization changes based on the supervisory data, as described above with respect to FIG. 1C. Additionally, for relative carrier frequency modulation, the optical transmitter may adjust the carrier frequency of at least one of the X-polarization and the Y-polarization of the optical signal based on the supervisory data such that the relative carrier difference between the X-polarization and the Y-polarization changes based on the supervisory data, as described above with respect to FIG. 1D.

Following step 804, the method 800 may end. Therefore, the method 800 may be implemented for modulating supervisory data on an optical signal through carrier polarization modulation, relative carrier phase modulation and/or relative carrier frequency modulation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 800 may further include operations performed by one or more optical receivers for demodulating the supervisory data from the optical signal. Further, the modulation described may be performed in the optical or electrical domain depending on the desired implementation of the method 800. Additionally, the particular orientations of the polarizations of the optical signal may vary depending on the optical network.

Further, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of modulating supervisory data onto an optical signal comprising:
   receiving supervisory data; and
   adjusting a characteristic of a carrier of an optical signal for at least one of a first polarization component of the optical signal and a second polarization component of the optical signal based on the received supervisory data such that:
      there is a relative difference between the characteristic for the first polarization component and the second polarization component, the relative difference indicating the supervisory data; or
      there is a change in a polarization orientation of the carrier on a Poincaré sphere that indicates the supervisory data.

2. The method of claim 1, wherein the characteristic is a carrier phase of the first polarization component and the second polarization component.

3. The method of claim 1, wherein the characteristic is a carrier frequency of the first polarization component and the second polarization component.

4. The method of claim 1, wherein the characteristic is a polarization orientation of the carrier on the Poincaré sphere.

5. The method of claim 1, further comprising performing operations in an electrical domain to adjust the characteristic of the carrier for at least one of the first polarization component and the second polarization component.

6. The method of claim 1, further comprising performing operations in an optical domain to adjust the characteristic of the carrier for at least one of the first polarization component and the second polarization component.

7. The method of claim 1, further comprising demodulating the supervisory data from the optical signal using a coherent optical receiver.

8. The method of claim 1, further comprising demodulating the supervisory data from the optical signal using a tunable frequency discriminator, a polarimeter and a signal processor of a supervisory data detector.

9. The method of claim 1, further comprising demodulating the supervisory data from the optical signal based on at least one of horizontal, vertical, plus forty-five degree, minus forty-five degree, left circular and right circular polarization components of the optical signal.

10. The method of claim 1, wherein a symbol rate associated with the supervisory data is less than a symbol rate associated with main data of the optical signal.

11. A system of modulating supervisory data onto an optical signal, the system comprising:
   an optical transmitter configured to:
     receive supervisory data;
     adjust a characteristic of a carrier of an optical signal for at least one of a first polarization component of the optical signal and a second polarization component of the optical signal based on the received supervisory data such that:
       there is a relative difference between the characteristic for the first polarization component and the second polarization component, the relative difference indicating the supervisory data; or
       there is a change in a polarization orientation of the carrier on a Poincaré sphere that indicates the supervisory data; and
     emit the optical signal.

12. The system of claim 11, wherein the characteristic is a carrier phase of the first polarization component and the second polarization component.

13. The system of claim 11, wherein the characteristic is a carrier frequency of the first polarization component and the second polarization component.

14. The system of claim 11, wherein the characteristic is a polarization orientation of the carrier on the Poincaré sphere.

15. The system of claim 11, wherein the optical transmitter is configured to perform operations in an electrical domain to adjust the characteristic of the carrier for at least one of the first polarization component and the second polarization component.

16. The system of claim 11, wherein the optical transmitter is configured to perform operations in an optical domain to adjust the characteristic of the carrier for at least one of the first polarization component and the second polarization component.

17. The system of claim 11, further comprising a coherent optical receiver configured to demodulate the supervisory data from the optical signal.

18. The system of claim 11, further comprising a supervisory data detector including a tunable frequency discriminator, a polarimeter and a signal processor configured to facilitate demodulation of the supervisory data from the optical signal.

19. The system of claim 11, further comprising an optical receiver configured to demodulate the supervisory data from the optical signal based on at least one of horizontal, vertical, plus forty-five degree, minus forty-five degree, left circular and right circular polarization components of the optical signal.

20. The system of claim 11, wherein a symbol rate associated with the supervisory data is less than a symbol rate associated with main data of the optical signal.

* * * * *